UNITED STATES PATENT OFFICE.

JEANNOT W. KENEVEL, OF PHILADELPHIA, PENNSYLVANIA, ASSIGNOR TO DISTOL MANUFACTURING COMPANY, OF WILMINGTON, DELAWARE, A CORPORATION OF DELAWARE.

DENATURED SPIRIT.

1,176,462.   Specification of Letters Patent.   Patented Mar. 21, 1916.

No Drawing. Original application filed May 17, 1911, Serial No. 627,712. Divided and this application filed November 20, 1911. Serial No. 661,229.

*To all whom it may concern:*

Be it known that I, JEANNOT W. KENEVEL, a citizen of the United States of America, residing in the city and county of Philadelphia, in the State of Pennsylvania, have invented a certain new and useful Improvement in Denatured Spirit, of which the following is a true and exact description, reference being had to the accompanying drawings, which form a part thereof.

The object of my present invention is a novel denatured spirit of a character and possessing properties hereinafter set forth, and which can be readily and economically manufactured, and in the manufacture of which various relatively inexpensive or waste materials can be utilized as hereinafter explained.

The denatured spirit herein claimed is a homogenous liquid product formed mainly or largely from ethyl alcohol vapors distilled from fermented vegetable matter but containing constituents whereby the product while generally similar to ethyl alcohol (hydrated oxid of ethyl) and equally valuable with ethyl alcohol for most purposes in the arts for which ethyl alcohol is or may be employed, is not, and cannot by any practical method be readily converted into a potable spirit, or one suitable for medicinal purposes.

Broadly speaking, the process which I employ in producing the denatured spirit claimed herein involves the destructive distillation of such carbonaceous organic materials as flesh, bones, coal, lignite, peat, wood, and other cellular vegetable materials, such as corn-stalks, weeds and grain straw, which, when so distilled, yield vapors composed of hydrocarbons, either free or mixed with nitrogenous compounds and condensing at temperatures in the neighborhood of that at which ethyl alcohol condenses. The temperature at which this destructive distillation is carried out will depend upon the material subjected to the distillation, but in general, it should be carried out at such temperatures and under such conditions as to produce a proportionately large yield of the desirable denaturant constituents, which are those which condense at temperatures at or about the rectification temperature of high proof ethyl alcohol, and are soluble in the denatured spirit ultimately produced, and in practice this means those soluble in ethyl alcohol.

In addition to the destructive distillation of carbonaceous organic material the formation of my denatured spirit involves also the generation of the alcoholic vapors from fermented materials: the mixture of these vapors with the vapors obtained by the destructive distillation step, or at least all constituents thereof which are soluble the denatured spirit produced, and condense at temperatures at or about the rectification tempe re of high proof ethyl alcohol, and as a final step the rectification of the mixture.

While the steps referred to are all essential to my preferred process of forming the denatured spirit claimed herein, they need not be carried out as separate and distinct steps, and, in practice, I prefer to condense all of the vapors from the destructive distillation of the organic material which condense at temperatures of about 200° Fahr. or below, prior to any mixture with ethyl alcohol and then pass the condensate or preferably a portion only of it as explained in the following paragraph, into a suitable distilling and rectifying apparatus into which the ethyl alcohol is introduced as vapors or as unrectified high wines, or in which ethyl alcohol vapors are generated from fermented materials.

In practice, I prefer to separate from the condensed vapors produced by destructive distillation and passed to the distilling and rectifying apparatus, the heavy tarry liquids condensing readily at or above 210° to 220° Fahrenheit, and also the substances which are gaseous at ordinary atmospheric temperatures. More or less valuable by-products may be obtained from the liquids, and to some extent also from the gaseous materials thus separated out and the gaseous materials have a fuel value.

Except for the partial purification referred to, I consider it not only unnecessary, but, in general, undesirable to otherwise refine or purify the products of the destructive distillation prior to their admixture with ethyl alcohol vapors and the rectification of the mixture, for most, if not all of the numerous different constituents of the residue including some present in relatively minute quantities add, or add to some noxious property of the ultimate denatured spirit produced.

By mixing the condensate from the destructive distillation with the fermented material in the preferred manner specified I avoid the formation of vapors at any stage of the operation which can be condensed as ethyl alcohol free from the denaturants, a desirable consideration as it tends to simplify and reduce the inspection and care necessary to avoid possible evasions of the excise regulations affecting the manufacture of alcoholic spirits. The generation of the vapors from the fermented material in the presence of the denaturant vapors I consider advantageous also, because I believe that this tends to the production of a more perfectly homogenous ultimate product, and tends also, I believe, to make the product more difficult to free from its denaturants. For ordinary practical purposes I consider wood and materials of a woody nature to be the most suitable substances to be destructively distilled for the production of denaturants in accordance with the present invention. The wood oil brought over during the destructive distillation of wood materially increases the calorific value of the final product.

When the organic material subjected to the destructive distillation in the process described is wood, or of a woody nature, a main constituent of the denaturant is methyl alcohol, but the vapors resulting from this distillation and eventually combined or dissolved in the denatured spirit, ordinarily and advantageously comprise also methyl acetate, furfurol, the mixture of phenols, known as creosote and other bodies of tarry and empyreumatic odor; formic aldehyde, acetone, and appreciable though minute quantities of formic acid, proprionic acid, butyric acid, valerianic acid, acetate of ammonia, methylamin and allyl alcohol, and to obtain these substances in relatively large amounts it is desirable that the destructive distillation of wood or woody materials should be carried on at a temperature ranging from about 300° to 530° Fahrenheit, and it should be explained at this point that, when the wood or woody materials subjected to the destructive distillation is of a resinous character, it is advisable to first treat the wood to free in a large measure from turpentine and the terpenes, partly because of the value of these byproducts and partly also because turpentine and the terpenes do not form suitable denaturants.

In the practical production of my improved spirit I have found that excellent results may be obtained by employing the spent liquor from the simultaneous rectification of the ethyl alcohol and denaturant vapors in cooking or otherwise preparing the vegetable material fermented to furnish the ethyl alcohol vapors. The use of the spent liquor for this purpose I believe to be advantageous because the use of the liquor materially hastens the fermentation; and also because the noxious materials thus admixed to the mash in effect poisons the latter and not only makes it impossible to generate pure undenatured ethyl alcohol from the mash, but results I believe in the utilization in the ultimate product of some of the noxious and hence desirable substances contained in the spent liquor.

It is one of the merits of my denatured spirit that because of the character of the spirit and the preferred apparatus and process employed in its production that the production of the denatured spirit may be carried on automatically and continuously except for the usual care with regard to the supplying of raw material, the discharge of waste material, and the maintenance of the proper temperature conditions, to effect the reaction of the material undergoing treatment and the vaporization and condensation of the varied constituents thereof.

Preferred forms of apparatus and methods for producing the denatured spirit claimed herein are disclosed in detail and claimed in my prior application Serial No. 627,712, filed May 17, 1911, of which this application is a division.

My improved denatured spirit claimed herein contains noxious and poisonous constituents which effectively prevent its use as a potable spirit or for medicinal purposes, and it may be readily distinguished from undenatured spirit both by chemical analysis and without such analysis on account of its repugnant pyroligneous odor and the irritating effect of the fumes given off when open to the atmosphere. Except as noted, however, the denatured spirit can be used for practically all purposes for which undenatured ethyl spirit is suitable and with equally good results. In particular the new spirit has practically the same solvent properties and the same fuel value as ethyl alcohol. It possesses in common with ethyl alcohol the desirable characteristic for a safe liquid fuel that when flaming the flames may be extinguished by throwing water on them. A very important practical advantage of the new spirit arises from the fact that its production may be carried out at a comparatively low cost since the denaturant constituents may be obtained by the destructive distillation of carbonaceous material of low cost, and indeed, as already pointed out, by the use of various farm refuse, and, furthermore, the production may be carried out in a simple manner and by the use of simple apparatus, and so that inspection by excise agents is practically unnecessary, or at the very least, so that such inspection is reduced to a minimum.

Having now described my invention, what I claim as new and desire to secure by Letters Patent is,

A denatured spirit condensed from a vapor body consisting of vapor distilled from fermented vegetable matter and products vaporized in the destructive distillation of wood, said products being unrefined except by the elimination of constituents boiling at temperatures substantially different from that at which ethyl alcohol boils.

JEANNOT W. KENEVEL.

Witnesses:
ARNOLD KATZ,
S. STEWART.